Patented Jan. 19, 1960

2,921,886

DENTIFRICE COMPOSITION COMPRISING AN N-HIGHER ALKYL MORPHOLINE

Gloria Christin Panepinto, Bayonne, N.J., assignor to Colgate-Palmolive Company, New York, N.Y., a corporation of Delaware No Drawing. Application November 28, 1958
Serial No. 776,674

14 Claims. (Cl. 167—93)

The present invention relates to a dentrifice preparation comprising a polishing agent and an N-higher alkyl morpholine compound, as hereinafter described and claimed.

According to the present invention, the dentrifice preparation comprises a polishing agent and an N-higher alkyl morpholine compound having 8 to 16 carbons, and preferably 10 to 14 carbons, in said alkyl group. The dentrifice preparation containing the specified alkyl morpholine compound which has protein adsorption characteristics described hereinafter exhibits marked beneficial anti-bacterial activity which is of particular desirability in the use of such composition.

Suitable examples of the specified N-higher alkyl morpholine compounds are N-n-octyl morpholine, N-n-decyl morpholine, N-lauryl morpholine, N-myristyl morpholine, N-coconut alkyl (mixed higher alkyl groups corresponding to mixture derived from coconut oil fatty acids) morpholine, N-palmityl morpholine, and the corresponding hydrochloride salts of each of said morpholines. The N-alkyl morpholines are tertiary amine bases which are not water-soluble in general but are usually water-dispersible to some extent. A feature of this invention resides in the use of the acid salts of these bases, such as the mineral acid salts, e.g., hydrochloride salts since these salts are generally water-soluble. When reference is made to the "morpholine compound," such term includes the free base and the acid salts thereof. The term "acid salts" refers to the salts derivable from a reaction of the lakyl morpholine base with an acid, e.g., hydrochloric acid (hydrogen chloride).

These N-higher alkyl morpholines are known materials and methods for their manufacture are described, for example, in "Journal of the American Chemical Society," vol. 70, page 618 (1948) and vol. 76, pages 3589–91 (1954). The acid salts of these alkyl morpholines may be formed using known applicable techniques. For example, dry hydrogen chloride gas may be bubbled through a solution of N-dodecyl morpholine in petroleum ether which results in the precipitation of the N-dodecyl mrpholine hydrochloride salt as it is formed. It may be recrystallized from a mixture of petroleum either and chloroform if desired. Alternatively, any convenient solution of the free base, such as an aqueous dispersion, may be treated with sufficient hydrochloric acid to form the corresponding salt. Other salts which may be formed in any suitable manner are other hydrohalide salts, sulfates, acetates and the like.

These N-alkyl morpholine compounds exhibit a high level of anti-bacterial power on the oral flora (the complex mixture of micro-organisms normally found in the mouth). They exhibit a superior effect in the inhibition of bacterial growth and markedly inhibit the production of acid from fermentable carbohydrates by the micro-organisms found in saliva.

It has been found that the specified N-alkyl morpholine compounds exhibit the unusual property of being adsorbed by proteinaceous material and subsequently released therefrom so as to exert these significant anti-bacterial effects. By reason thereof, these compounds can be effective for a prolonged period of time where they have been adsorbed on protein. For example, the specified N-alkyl morpholine compounds, particularly those having 10 to 14 carbons in the alkyl group, show a particularly high degree of anti-bacterial activity and inhibition of acid from fermentable carbohydrates even after adsorption of such materials upon casein or similar protein. This protein adsorption phenomenon is highly specific and it may be illustrated by protein adsorption test known in the art and summarized as follows.

A small amount of casein or similar equivalent protein material is immersed in a dilute solution of the ingredient to be tested, after which it is washed and dried. The treated protein is then added to tubes containing a Snyder medium (nutrient dextrose agar with brom-cresol green indicator) inoculated with saliva normally tending to produce acid from the Snyder medium. If the tube containing the treated protein in the Snyder medium has retained a predominantly green color after 72 hours' incubation at 37° C., then a sufficient amount of the active ingredient must have been adsorbed by the protein and released subsequently in the Snyder medium so as to markedly inhibit the acid production and bacterial growth. Control tubes without the treated protein normally turn yellow after 24 hours which is indicative of rapid and substantial acid production.

In these tests, the specified N-alkyl morpholine compounds show a superior acid-inhibition power after adsorption on the protein. It has been found that optimum effects are obtained with those in which the alkyl group has essentially 12 to 14 carbon atoms, particularly with the hydrochloride salts thereof. For example, an amount of the N-dodecyl or N-coconut morpholine used to treat the protein which is equivalent to less than 1000 mgs. per 100 cc. of saliva is generally sufficient to maintain a predominantly green color in the Snyder medium. The hydrochloride salts of these materials show activity in the range of about 250–750 mgs. The effects using the octyl morpholine and palmityl morpholine are significant also but are in the range of up to several thousand milligrams. As indicative of the specificity of action with respect to these active ingredients, the N-tallow alkyl morpholine wherein the N-alkyl groups are a mixture corresponding to the alkyl groups in the fatty acids of tallow has been found to be ineffective in an amount corresponding to 15,000 milligrams per 100 cc. of the saliva. In addition, it is known that ordinary wetting or detersive materials, such as soap and sulfonated compounds are ineffective generally.

It has been found that the specified N-alkyl morpholine compounds are compatible with polishing agents. The polishing agent used in these dentrifice preparations should be essentially water-soluble. There is a relatively large number of such materials known in the art. Representative materials include, for example, calcium carbonate, anhydrous and hydrated dicalcium phosphate, tricalcium phosphate, calcium pyrophosphate, insoluble sodium metaphosphate, aluminum hydroxide, magnesium carbonate, calcium sulfate and bentonite, including suitable mixtures thereof. In general, it is preferred to employ a polishing material comprising a water-insoluble phosphate polishing agent.

These essential ingredients should be used in suitable proportions. The morpholine compound is employed in a minor amount. It will be used usually in an effective amount from about 0.05 to about 10%, preferably about 0.5 to 3%, by weight of the dentrifice preparation. The polishing agent content is variable and will be usually from about 20–99% by weight depending upon the specific composition, such as a tooth paste or powder.

It has been found also that the alkyl morpholine compounds are compatible also with a variety of surface-active materials. The dentifrice composition should contain usually any suitable surface-active or detersive material to provide desired detersive and foaming properties. Suitable detergents are water-soluble salts of higher fatty acid monoglyceride monosulfate, higher alkyl sulfate, alkyl aryl sulfonate, higher alkyl sulfoacetate, higher fatty acid ester of 1,2 dihydroxy propane sulfonate, the substantially saturated higher aliphatic acyl amides of lower aliphatic amino carboxylic acid compounds, such as those having 12 to 16 carbons in the acyl radical, and the like. Examples of the amides are N-lauroyl sarcosine, and the sodium, potassium and ethanolamine salts of N-lauroyl, myristoyl or palmitoyl sarcosides. They should be substantially free from soap or similar higher fatty acid material which tends to substantially reduce the effect of these compounds. The use of such amide compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

The various surface-active materials should be used in a suitable amount, preferably from about 0.5 to 5% by weight of the dentifrice preparation.

The dentifrice should be in a suitable form, such as a dental cream or toothpaste, or a tooth powder. The compositions are prepared in the usual manner. The N-higher alkyl morpholines bases are liquid materials usually and the salts are usually water-soluble solids. They may be suitably dissolved or dispersed in the dental cream, and may be mixed with or adsorbed upon the abrasive or an inert solid material in the tooth powder.

The dental creams contain liquid material such as water, glycerine, sorbitol, propylene glycol including suitable mixtures thereof. It is advantageous to use a mixture of both water and a humectant or binder such as glycerine or sorbitol. It is preferred to use also a small amount of a gelling agent such as the natural and synthetic gums, e.g., Irish moss, sodium carboxymethyl-cellulose, and the like.

Various other materials may be incorporated in the dentifrice preparations. Examples are soluble saccharin, flavoring oils, coloring or whitening agents, preservatives, emulsifying agents, silicones, chlorophyll compounds, and the like.

The following specific examples are further illustrative of the nature of the present invention but it is to be understood that the invention is not limited thereto. The compositions are prepared in the usual manner and all amounts of the various ingredients are by weight.

*Example I.—Dental cream*

|  | Percent |
|---|---|
| N-coconut alkyl morpholine | 1.00 |
| Dicalcium phosphate dihydrate | 44.00 |
| Sodium coconut monoglyceride sulfate | 2.00 |
| Glycerine | 28.30 |
| Water | 20.15 |
| Irish moss gum | 9.95 |
|  | 96.40 | the balance consisting essentially of soluble saccharin, flavor and preservatives.

In the above dental cream, the coconut morpholine may be substituted by N-octyl, N-decyl, N-lauryl, N-myristyl and N-palmityl morpholines which produce satisfactory dental creams also.

*Example II*

A dental cream base is prepared containing 24% glycerine, 47% dicalcium phosphate, 5% calcium carbonate, 16% distilled water and 0.75% Irish moss gum, with small amounts of preservatives and sweetening agent. To 93 parts of this base, there is added with stirring 7 parts of an aqueous solution containing about 1 part N-coconut alkyl morpholine hydrochloride to form a homogeneous dental cream. This dental cream is extracted with alcohol which is vaporized and the residue is diluted with water and used to treat protein in the protein adsorption test. The results show that the dental cream possesses substantial acid-inhibiting power.

*Example III.—Dental cream*

Using the same formulation and procedure as in Example II, except for the substitution of N-dodecyl morpholine hydrochloride for the N-coconut morpholine salt, there is obtained a dental cream which is extracted and treated with protein similarly. The treated protein exhibits marked ability to inhibit acid also.

*Example IV.—Dental cream*

The same formulation and procedure is used as in Example II except that the aqueous solution contained 1 part of dodecyl morpholine hydrogen chloride and 2 parts of sodium N-lauroyl sarcoside. The resulting cream is highly effective in inhibition of acid as indicated by the same protein adsorption procedure.

*Example V.—Dental cream*

The same formulation and procedure is followed as in Example III, except that a small amount of sodium hydroxide is added to the aqueous solution of the N-dodecyl morpholine hydrochloride until the solution is cloudy and has a pH of 6.6 prior to admixture with the base. The resulting dental cream is markedly effective in the protein adsorption test also.

*Example VI.—Dental cream*

N-dodecyl morpholine hydrochloride is added in an amount of 0.5% by weight during the preparation of a dental cream containing about 0.2% sodium fluoride, 2% sodium N-lauroyl sarcoside, 45% insoluble sodium metaphosphate, and 5% dicalcium phosphate, admixed with glycerine, water, gum and the like which results in a satisfactory dental cream also.

*Example VII.—Tooth powder*

|  | Percent |
|---|---|
| N-dodecyl morpholine | 1.0 |
| Calcium carbonate | 25.0 |
| Dicalcium phosphate dihydrate | 70.0 |
| Sodium N-lauroyl sarcoside | 2.0 |
| Flavor | 1.6 |
| Soluble saccharin | 0.4 |
|  | 100.0 |

Although the present invention has been described with reference to particular embodiments and examples, it will be apparent to those skilled in the art that variations and modifications to this invention can be made and equivalents can be substituted therefor without departing from the principles and true spirit of the invention.

This application is a continuation-in-part of Serial No. 552,707, filed December 13, 1955, and now abandoned.

Having thus described the invention, what is claimed is:

1. A dentifrice preparation comprising a polishing agent and about 0.05 to 10% by weight of an N-alkyl morpholine compound, said alkyl group having 8 to 16 carbon atoms.

2. A dentifrice preparation in accordance with claim 1 wherein the alkyl group of said morpholine compound is dodecyl.

3. A dentifrice preparation comprising a polishing agent and about 0.05 to 10% by weight of an N-higher alkyl morpholine having 10 to 14 carbons in said alkyl group.

4. A dentifrice preparation in accordance with claim 3 wherein said N-alkyl morpholine is N-lauryl morpholine.

5. A dentifrice preparation in accordance with claim 3 wherein said N-alyl morpholine is N-myristyl morpholine.

6. A dental cream comprising a polishing agent, water, humectant and about 0.5 to 3% by weight of N-coconut alkyl morpholine.

7. A dental cream comprising at least about 20% polishing agent suspended in a liquid vehicle comprising water and humectant, and about 0.5 to 3% by weight of an N-higher alkyl morpholine compound having 10 to 14 carbons in said alkyl group.

8. A dentifrice preparation comprising a polishing agent, a detergent and about 0.05 to 10% by weight of an N-alkyl morpholine compound, said alkyl group having 10 to 14 carbon atoms.

9. A dentifrice preparation comprising at least about 20% polishing agent and about 0.5 to 5% of a substantially saturated higher aliphatic acyl amide of lower aliphatic amino carboxylic acid compounds having 12 to 16 carbons in the acyl radical, said amide being substantially free from higher fatty acid material tending to substantially adversely affect said amide, and about 0.05 to 10% by weight of an N-higher alkyl morpholine compound, said alkyl group having 10 to 14 carbon atoms.

10. A dentifrice preparation in accordance with claim 9 which contains a hydrochloride salt of said morpholine compound.

11. A dentifrice preparation comprising a polishing agent and about 0.05 to 10% by weight of an acid salt of an N-alkyl morpholine, said alkyl group having 10 to 14 carbon atoms.

12. A dentifrice preparation in accordance with claim 11 wherein the alkyl of said morpholine compound is a mixture of alkyl groups derived from coconut oil fatty acids.

13. A dentifrice preparation in accordance with claim 11 wherein said morpholine salt is a salt of the N-alkyl morpholine and a mineral acid.

14. A dentifrice preparation comprising a polishing agent and about 0.05 to 10% by weight of a hydrochloride salt of an N-alkyl morpholine compound, said alkyl group having 10 to 14 carbon atoms.

References Cited in the file of this patent

UNITED STATES PATENTS 2,689,170    King  ---------------- Sept. 14, 1954

OTHER REFERENCES

Fosdick: J. Dent. Res., vol. 32, No. 4, August 1953, pp. 486–496.